United States Patent Office 3,137,619
Patented June 16, 1964

3,137,619
VETERINARY ANTI-DIARRHEA COMPOSITION
Kenneth E. Kueter, Lake Forest, Ill., assignor to Abbott Laboratories, North Chicago, Ill., a corporation of Illinois
No Drawing. Filed Jan. 18, 1962, Ser. No. 167,152
2 Claims. (Cl. 167—53)

This invention relates to a therapeutic composition useful in the treatment of lower warm-blooded animals and more particularly to an improved therapeutic composition for the treatment of diarrhea and related malabsorption syndromes in domesticated animals and fowl.

Commercial rabbit breeders, for example, find that diarrhea is by far the most serious ailment encountered in raising domestic rabbits and is responsible for more fatalities than all other causes combined. Heretofore, approximately 25% of all diarrhea cases in young rabbits resulted in death and a still larger percentage of rabbits recover only after a prolonged recuperation from the dehydration and emaciation accompanying the diarrhea. There are several known causes of diarrhea in rabbits and other warm-blooded animals, including abrupt changes in food and drinking water composition. Since the foregoing causes can generally be controlled, the more serious causes are pathogenic agents, such as mucoid enteritis which especially affects pre-weaning litters, and the airborne micro-organisms which are most difficult to control even with the use of ultra-violet lights throughout the rabbit rooms.

It is therefore an object of the present invention to provide an improved composition of matter for the treatment of diarrhea and related malabsorptive syndromes in lower warm-blooded animals.

It is also a specific object of the invention to provide a more effective means for treating the intestinal tract with antibiotics where there is diarrhea, or similar malabsorptive syndromes associated with hyperperistalsis.

Other objects of the invention will be apparent from the following detailed description and the claims to follow.

It has generally been found that most antibiotics are of little value in the treatment of diarrhea. Certain antibiotics actually induce diarrhea as a result of significantly altering the flora in the intestinal tract. Streptomycin has shown some indications of having specific utility against diarrhea due to Salmonella and Shigella organisms.

It has been now found that the antibotic erythromycin, normally having no utility in the treatment of diarrheas, when combined with a compound having antispasmodic activity, such as N-($\beta$-cyclohexyl-$\beta$-phenyl-$\beta$-hydroxyethyl)-N'-methylpiperazine, is remarkably effective in controlling diarrhea in lower warm-blooded animals, such as canines, primates, leporidae, swine, felines, rodents and fowl. Utility of this invention has not been established in humans. The combination of erythromycin and antispasmodic drug has been found to reduce the fatalities of young rabbits having diarrhea from about 25% to less than 10%, with over 80% of the rabbits recovering after only two feedings of the new composition. The novel combinations and methods of treatment are surprisingly effective against the most severe and frequently fatal type of intestinal malabsorptive syndrome known as bloody diarrhea. The heretofore usual experience of animal husbandryman has been that groups of animals afflicted with bloody diarrhea do not respond to known types of treatment, with the result that the majority die and the survivors suffer from severe debilitation.

The following specific examples are for the purpose of illustrating the present invention and not to be construed to limit the invention to the precise proportions and composition specified.

Example I

A suspension is prepared comprising a uniformly dispersed mixture of 25 cc. of 1.5% solution of the drug N-($\beta$-cyclohexyl - $\beta$ - phenyl - $\beta$ - hydroxyethyl)-N'-methylpiperazine methosulfate in water and 75 cc. of an aqueous suspension of erythromycin containing about 3% (w./v.) erythromycin having an activity of about 600 u./mg.

The erythromycin aqueous suspension has the following specific composition in the preferred embodiment:

| | G. |
|---|---|
| Erythromycin stearate (600 u./mg.), 100.000 mg./5 cc. dose | 33.33 |
| Aseptoform M, 0.1% | 1.0 |
| Aseptoform P, 0.02% | .2 |
| Sodium citrate, granular, 10.0% | 100.00 |
| Sodium carboxymethylcellulose, 0.3% | 3.0 |
| Veegum (complex magnesium, aluminum silicate), 1.0% | 10.0 |
| Dupanol P.C., 0.1% | 1.0 |
| Sugar, cane, 75.0% | 750.0 |
| Dye, bright orange, 0.002% | 0.2 |
| Oil cassia, 0.12% | 1.20 |
| Distilled water, q.s. 1000.00 cc. | |

The foregoing composition provides 100 mg. erythromycin and 20 mg. N-($\beta$-cyclohexyl-$\beta$-phenyl-$\beta$-hydroxyethyl)-N'-methylpiperazine methosulfate per 5 cc. dose.

Example II

A palatable stable aqueous suspension having the following composition is prepared:

| | Mg./cc. |
|---|---|
| Erythromycin stearate (600 u./mg.) | 20.00 |
| N - ($\beta$ - cyclohexyl - $\beta$ - phenyl - $\beta$ - hydroxyethyl)-N'-methylpiperazine methiodide | 5.0 |
| Concentrated beef extract (Bacto-Beef Extract Difco) | 100.00 |
| Aseptoform | 6.0 |
| Benzoic acid | 2.0 |
| Mono-sodium glutamate | 1.0 |
| Tragacanth (2% aqueous solution), q.s. 1000.00 cc. | |

The latter composition is particularly designed for administration to dogs and monkeys, since the palatable nature of the composition makes it particularly acceptable to the animals and eliminates the necessity of oral intubation. Quaternary ammonium salts other than the said methiodide can be used.

It should be understood that whereas the prior specific examples have shown the composition as a fluid suspension, the present invention also contemplates providing the improved anti-diarrhea composition in the form of a tablet or dry mix in which the erythromycin is present as the free base or as a salt in an amount between about 25 mg. and 200 mg. uniformly admixed with the said antispasmodic drug in an amount between about 10 mg. and 50 mg., as a dosage form. The tablets can be suitably flavored or coated as desired.

And, whereas the aqueous suspensions set forth in the specific examples employ the relatively insoluble erythromycin salt, erythromycin stearate, other relatively insoluble salts of erythromycin, such as erythromycin thiocyanate can be used. In addition to these salts, erythromycin B and its non-toxic salts, and their esters and ester salts may be used in any of the therapeutic forms known to the veterinary art. Where the suspension is prepared by adding water to the dry ingredients relatively soon before administration or when a solid dry mixture is used, the more soluble known non-toxic salt of erythromycin or erythromycin base can be employed.

Example III

The effects of erythromycin and N-(β-cyclohexyl-β-phenyl-β-hydroxyethyl)-N'-methylpiperazine methosulfate were compared, separately and in combination with one another, in a rabbit colony afflicted with diarrhea.

A group of 48 New Zealand White rabbits, predominantly female, between six and eight weeks of age and weighing from four to five pounds, were treated for profuse watery diarrhea typical of shipping fever characteristic to rabbits. All rabbits before the initiation of treatment were listless, had hair standing, and suffered from excessive thirst and dehydration.

The rabbits were divided into three equal groups with Group 1 receiving one daily oral dose of 100 mg. of erythromycin in dry capsule form, Group 2 receiving one daily oral dose of 20 mg. of N-(β-cyclohexyl-β-phenyl-β-hydroxyethyl)-N'-methylpiperazine methosulfate in dry capsule form, and Group 3 receiving one daily oral dose in dry capsule form of 100 mg. erythromycin plus 20 mg. N-(β-cyclohexyl-β-phenyl-β-hydroxyethyl)-N'-methylpiperazine methosulfate.

After several days treatment, when the surviving rabbits had recovered from the diarrhea, approximately 25% of the rabbits in Groups 1 and 2 survived, the remaining 75% having died as a result of the diarrhea and miscellaneous sequelae. In Group 3, 20% of the rabbits had died with the remaining 80% satisfactorily recovered from the shipping fever-induced diarrhea.

From experience it is to be expected that approximately 25% of a group of rabbits will recover from shipping fever-induced diarrhea without any treatment. It is therefore concluded that erythromycin and N-(β-cyclohexyl-β-phenyl-β-hydroxyethyl)-N'-methylpiperazine methosulfate individually have no discernible effect upon diarrhea while these drugs in combination are highly effective in alleviating diarrhea and related conditions.

While the combination of relatively insoluble erythromycin salt and the compound N-(β-cyclohexyl-β-phenyl-β-hydroxyethyl)-N'-methylpiperazine methosulfate having antispasmodic activity with selective anticholinergic action is particularly effective, it should be understood that the present invention also contemplates the use of other antispasmodic drugs in combination with erythromycin. Thus propantheline bromide, methantheline bromide, methascopolamine bromide, N-1,5-trimethyl-4-hexenylamine, 2 - benziloyloxymethyl - 1,1 - dimethylpyrrolidinium methyl sulfate and 1-methyl-1,4,5,6-tetrahydro-2-pyrinidylmethyl-α-phenyl glycolate hydrochloride can also be advantageously combined with erythromycin in substantially the same proportions as in Examples I and II.

The compositions of the present invention are preferably administered to the lower warm-blooded animals so that between about 1 and 20 mg. of erythromycin and a therapeutic level of antispasmodic drug, for example 0.2 to 5 mg. of N-(β-cyclohexyl-β-phenyl-β-hydroxyethyl)-N'-methylpiperazine methosulfate [hexocyclium], are administered per pound of body weight, with the larger animals receiving the lower level of the drugs per pound of weight. Typical oral doses for one of the veterinary therapeutic combinations, erythromycin plus hexicyclium, are the following: cats and small dogs, 100 to 200 mg. erythromycin plus 20 to 40 mg. hexocyclium; rabbits, 50 to 100 mg. erythromycin plus 10 to 20 mg. hexocyclium; larger animals, 100 mg. erythromycin plus 20 mg. hexocyclium salt per 25 to 40 lbs. of body weight; chickens, 5 to 50 mg. antibiotic plus 2 to 10 mg. antispasmodic. Dosage levels can be adjusted and doses repeated as required.

This application is a continuation-in-part of my co-pending application, Serial No. 738,952, filed June 2, 1958, now abandoned.

Others may practice the invention in any of the numerous ways which will be suggested by this disclosure to one skilled in the art. All such practice of the invention is considered to be a part hereof provided it falls within the scope of the appended claims.

I claim:

1. A composition of matter useful for alleviating bloody diarrhea and similar malabsorptive syndromes associated with hyperperistalsis in domestic animals and fowl essentially consisting of erythromycin and a quaternary ammonium salt of N-(β-cyclohexyl-β-phenyl-β-hydroxyethyl)-N'-methylpiperazine methosulfate.

2. The composition of claim 1 containing between about 1 and about 200 mg. of erythromycin and between about 2 and about 50 mg. of the quaternary ammonium salt, the combination being in dry dosage unit form.

References Cited in the file of this patent

UNITED STATES PATENTS

| | | |
|---|---|---|
| 2,907,765 | Weston | Oct. 6, 1959 |
| 2,907,766 | Weston et al. | Oct. 6, 1959 |
| 2,918,405 | Barr et al. | Dec. 22, 1959 |
| 3,060,086 | Kueter | Oct. 23, 1962 |

OTHER REFERENCES (PDR) Physician's Desk Reference, 11th Ed., Medical Economics, Inc., 1956, "Ilotycin" entries, pages 479 and 333; "TRAL," page 412.

Helgren et al.: J. Am. Pharm. Assoc. (Sci. Ed.), vol. 46 (1957), pages 639–643.

Kean et al.: The Diarrhea of Travelers III, The New England Journal of Medicine, vol. 261, No. 2, July 9, 1959, pages 71–74.

Adelson: The Coroner of Elsinore, The New England Journal of Medicine, vol. 262, No. 5, February 4, 1960, pages 229–236.